United States Patent [19]

Hitomi

[11] Patent Number: 4,874,140
[45] Date of Patent: Oct. 17, 1989

[54] FISHING REEL
[75] Inventor: Yasuhiro Hitomi, Sakai, Japan
[73] Assignee: Shimano Industrial Company Limited, Osaka, Japan
[21] Appl. No.: 262,706
[22] Filed: Oct. 26, 1988
[30] Foreign Application Priority Data Oct. 31, 1987 [JP] Japan .................................. 62-276407

[51] Int. Cl.[4] ............................................. A01K 89/01
[52] U.S. Cl. ................................................... 242/223
[58] Field of Search ...................... 242/84.1 J, 84.1 M, 242/84.1 K; 33/129, 127

[56] References Cited

U.S. PATENT DOCUMENTS

| 2,489,614 | 11/1949 | Brikoff | 242/84.1 M X |
| 2,500,026 | 3/1950 | Erikson | 242/84.1 M |
| 2,713,274 | 7/1955 | Lockwood | 242/84.1 J X |
| 2,752,686 | 7/1956 | Anderson | 242/84.1 M |
| 2,762,129 | 9/1956 | Morgan | 33/129 |
| 3,136,066 | 6/1964 | Spinn | 242/84.1 M X |
| 3,909,949 | 10/1975 | Miyamae | 242/84.1 M X |
| 4,044,968 | 8/1977 | Scott | 242/84.1 M X |

FOREIGN PATENT DOCUMENTS 57-7972 1/1982 Japan .

Primary Examiner—Stuart S. Levy
Assistant Examiner—Katherine Matecki
Attorney, Agent, or Firm—Stevens, Davis, Miller & Mosher

[57] ABSTRACT

A fishing reel is provided which includes a grip rotatably supported to a grip shaft fixed to a handle. A counter is disposed in a cavity in the grip and counts the number of complete revolutions of the grip relative to the grip shaft when the handle rotates. A display unit associated with the counter is positioned on the outer surface of the grip to display an indication of the amount of fishing line which is wound on a spool based on the counted number of complete revolutions of the grip relative to the grip shaft.

4 Claims, 3 Drawing Sheets

FIG. 5
FIG. 4
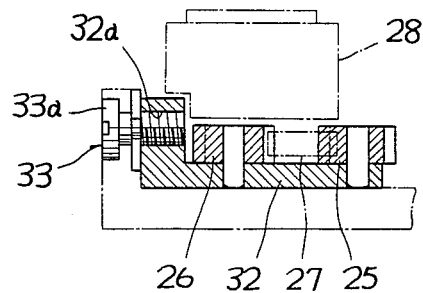
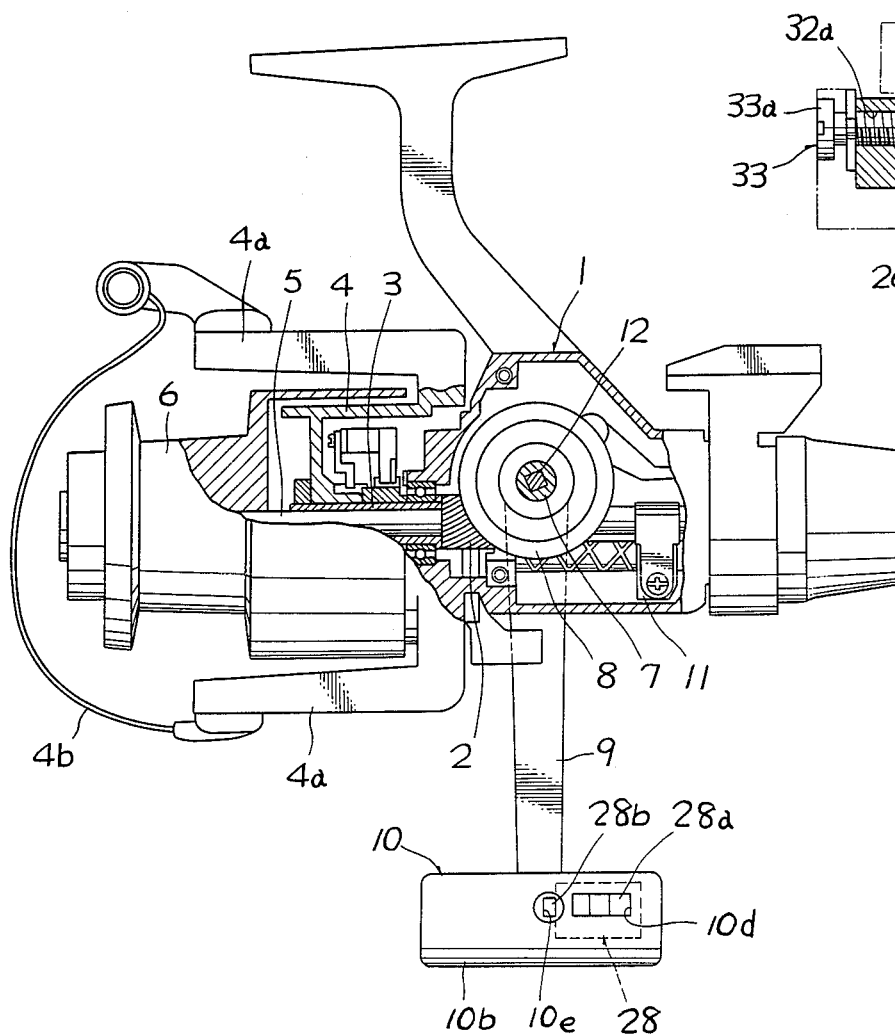
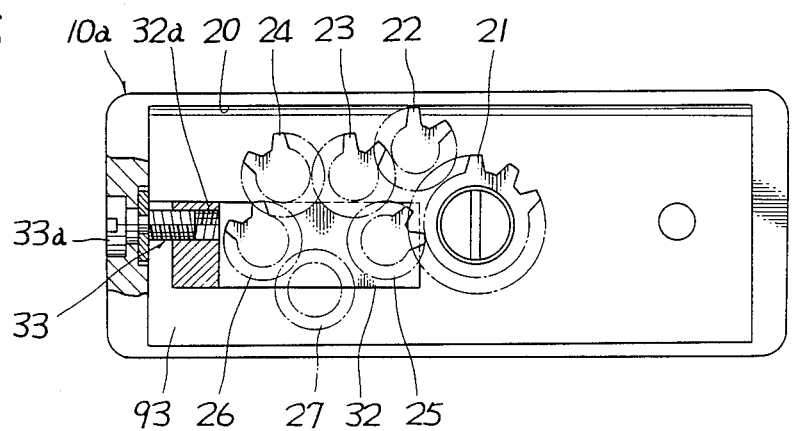
FIG. 6

FISHING REEL

FIELD OF THE INVENTION

The present invention relates to a fishing reel, and more particularly, to a fishing reel, which is provided with a reel body, including a spool and a handle supported rotatably to the reel body, with the handle being rotated to wind up a fishing line onto the spool and which is capable of measuring and displaying the length of the fishing line wound on the spool and the length of the line drawn out therefrom.

BACKGROUND OF THE INVENTION

Japanese Utility Model Laid-Open Gazette No. Sho. 57-7,972 discloses a fishing reel capable of measuring the length of the drawn-out fishing line.

This conventional reel is constructed such that an output gear is fixed to a handle shaft projecting into a reel body, and an intermediate gear engageable with the output gear and a driven gear rotatable in association with the output gear through the intermediate gear are housed in the reel body. A shaft of the driven gear passes through the reel body and projects to the exterior thereof, and a counter having a display unit is mounted on the outside surface of the reel body, so that the shaft of the driven gear associates with the counter.

However, since the conventional reel body contains therein the output gear, intermediate gear and driven gear and is provided at the outside surface with the display unit, it is required to construct the reel body to be large enough to house therein the above-mentioned gears, or strong enough to support the intermediate gear and the driven gear. This creates a problem in that the reel body must be large in size and have a complicated construction, thus leading to a high manufacturing cost. Also, the counter, which projects from the outer surface of the reel body, is subject to being broken due to contact with foreign objects.

SUMMARY OF THE INVENTION

The present inventor has observed that the fishing reel is provided at its handle with a grip which rotates relative to the handle when rotated, and that the grip can be provided with a counter therein. An object of the invention is to provide a fishing reel which can measure and display at the grip a length of the drawn-out fishing line merely by changing the grip construction without changing the reel body side, thereby solving the problem in the conventional reel requiring a large-sized reel body and including a member projecting to the exterior therefrom.

The invention is characterized in that the grip is utilized to house therein a counter so as to measure and display a fishing line winding up amount, and in turn a length of the drawn-out fishing line.

The fishing reel of the invention, which is provided with a reel body having a spool and a handle rotatably supported to the reel body so that the handle rotates to wind up the fishing line onto the spool, includes a grip shaft fixed to a free end of the handle, a grip rotatably supported to the grip shaft and provided with a cavity, and a counter which responds to rotation of the grip shaft relative to the grip so as to count the number of complete revolutions thereof when the handle is rotated. The reel also is provided with a display unit for converting the number of revolutions into an indication of the length of the wound fishing line. The counter is housed in the cavity, and the display unit is exposed to the exterior of the grip, so that when the line is wound onto the spool by rotating the handle, the grip displays the length of the wound-up line.

When an angler, after the line is drawn out from the spool, grasps the grip to rotate the handle, the handle rotates with respect to the grip and the counter operates in association with the rotation of the handle and counts the number of revolutions of the grip relative to the handle, with the number of revolutions being converted into the length of wound fishing line and displayed by the display unit.

The present invention, as described above, includes a counter housed in a cavity in the grip so as to count the number of revolutions of the grip relative to the handle, whereby the length of the wound fishing line, and in turn the drawn-out fishing line, can be measured and displayed merely by changing the grip construction without changing the reel body construction, resulting in that the reel need not have a large overall size. Also, the fishing reel of the invention is advantageous in that the counter housed in the cavity is less likely to be broken due to contact with foreign objects.

The above and further objects and novel features of the invention will be more fully apparent from the following detailed description when the same is read in connection with the accompanying drawings.

BRIEF DESCRIPTION OF THE DRAWINGS

FIG. 4 is a sectional view of a gear supported member only;

FIG. 5 is a side view of the entire fishing reel;

FIG. 6 is a partially cutaway plan view showing the gear support member when moved, corresponding to FIG. 2;

DETAILED DESCRIPTION OF THE PREFERRED EMBODIMENTS

Figure 1:
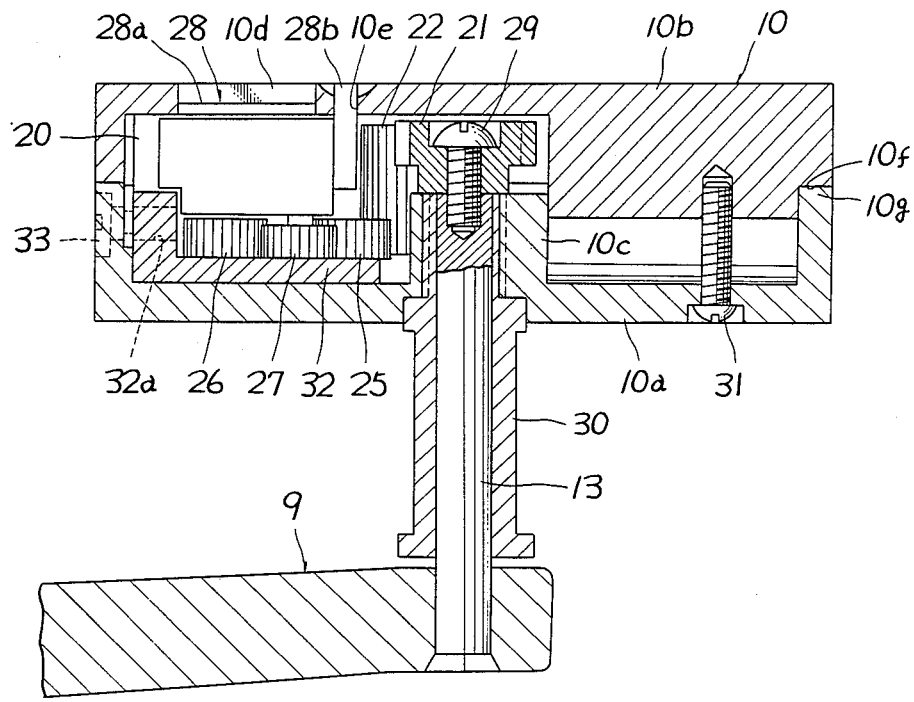
FIG. 1 is an enlarged sectional view of a first embodiment of a fishing reel of the invention, showing only the principal portion thereof.

FIG. 5 illustrates a spinning reel constructed such that a tubular driving shaft 3 having a pinion 2 is rotatably supported to a reel body 1 through a bearing 1a. A rotary frame 4 having a cylindrical portion and a pair of support arms 4a is mounted on the outer periphery of the utmost end of driving shaft 3. A spool shaft 5 is supported in a shaft bore of driving shaft 3 to be rotatable and axially movable therein. A spool 6 is supported to the utmost end of spool shaft 5, and a drag mechanism (not shown), for applying resistance against rotation of spool shaft 5, is provided between the rear end of spool shaft 5 which projects into reel body 1 and the rear portion thereof. A handle shaft 7 extending perpendicularly to the axis of driving shaft 3 is rotatably supported to reel body 1 through a bearing. A master gear 8 engageable with pinion 2 is provided on handle shaft 7, and a handle 9 having a grip 10 is also provided on handle shaft 7. Handle 9 is rotated to drive driving shaft 3 so as to rotate rotary frame 4 and move spool 6 longitudinally of reel body 1 through a reciprocating mechanism 11 housed therein. A bail arm 4b supported across support arms 4a guides a fishing line onto spool 6, thereby winding up the line onto spool 6.

Handle 9 can selectively be mounted as desired on either end of handle shaft 7. At the base of handle 9 at its mounting side to handle shaft 7 is provided a shaft 12 having a square cross-section and detachably insertable into a square shaft bore in handle shaft 7. Square shaft 12 is inserted into handle shaft 7 and a set screw (not shown) tightly screws with the utmost end of shaft 12, thereby selectively mounting handle 9 to the right-hand end or the left-hand end of handle shaft 7 with respect to reel body 1.

A grip shaft 13 for supporting grip 10 is fixed preferably by caulking to the utmost end of handle 9 as shown in FIG. 1. Grip 10 preferably has a cylindrical shape and is rotatably supported to grip shaft 13.

In a first embodiment of the fishing reel of the invention shown in FIGS. 1 through 6, a cavity 20 provided in grip 10 houses an output gear 21, a relay gear 22, first and second intermediate gears 23 and 24, first and second selecting gears 25 and 26, and a counter 28 having a count gear 27, to be discussed in detail below.

Grip 10, as shown in FIG. 1, is divided longitudinally into two upper and lower half parts. Lower half grip 10a is open upwardly and provided at a lengthwise center portion with a boss 10c. A bearing cylinder 30 is sleeved onto grip shaft 13 to rotatably support grip 10 with respect to grip shaft 13 and is spline-coupled with boss 10c. Grip shaft 13 is inserted into bearing cylinder 30, and output gear 21 is fixed to the axial end of grip shaft 13 coaxially therewith through a screw bolt 29. As a result, grip 10 is mounted to grip shaft 13 to be rotatable but not axially movable relative thereto.

Upper half grip 10b positioned opposite to lower half grip 10a is opened downwardly, so that the openings of both upper and lower half grips 10a and 10b form cavity 20. Upper half grip 10b is provided with a window 10d communicating with cavity 20 and an insertion bore 10e into which a reset button for counter 28 to be discussed below is inserted. At the peripheral edges of the openings at lower and upper half grips 10a and 10b are provided a fitting projection 10g and a fitting recess 10f for aligning both upper and lower half grips 10a and 10b, which are coupled with each other by a screw bolt 31.

Relay gear 22 housed in cavity 20 is larger in axial length and is rotatably supported to the walls forming cavity 20. Gear 22 engages at its upper portion with output gear 21. First and second intermediate gears 23 and 24 are rotatably supported to the bottom wall of lower half grip 10a and are disposed in series lengthwise of cavity 20. Gears 23 and 24 are always engaged with each other. First intermediate gear 23 engages with the lower portion of relay gear 22. Thus, intermediate gears 23 and 24 engage in series with output gear 21.

Also, first and second intermediate gears 23 and 24 are disposed such that the engaging portion therebetween is positioned opposite to count gear 27 of counter 28 at a predetermined widthwise interval. First and second selecting gears 25 and 26 are disposed between first and second intermediate gears 23 and 24 and count gear 27 and opposite thereto.

First and second selecting gears 25 and 26 selectively control engagement of first intermediate gear 23 with count gear 27 or engagement of second intermediate gear 24 with count gear 27. First intermediate gear 23 is not associated with count gear 27 through second intermediate gear 24, but second intermediate gear 24 is associated with count gear 27 through first intermediate gear 23. As a result, when output gear 21 rotates in a single direction, the rotating direction of count gear 27 is forward or reverse in accordance with selection of first or second selecting gears 25 or 26. This means that when output gear 21 is different in the rotating direction, i.e., when handle 9 is selectively mounted to the left-hand side or the right-hand side of reel body 1, the relative-rotating direction of output gear 21 changes to be forward or reserve with respect to the rotation of handle 9. Even in this case, selecting gear 25 or 26 is selected to enable count gear 27 to rotate in the same direction.

Figure 2:
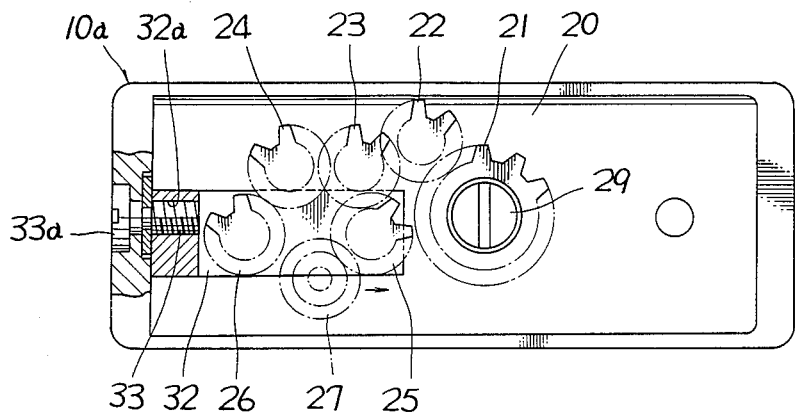
FIG. 2 is a partially cutaway plan view of a lower half grip of the first embodiment in FIG. 1, from which an upper half grip is removed.
Figure 3:
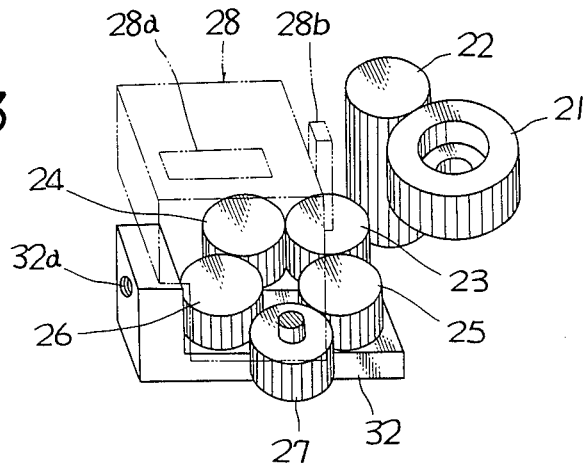
FIG. 3 is a perspective view of an association mechanism only.

Also, first and second selecting gears 25 and 26, as shown in FIG. 4, are rotatably supported to a gear support member 32 disposed lengthwise of grip 10, i.e., parallel to the disposed direction of intermediate gears 23 and 24, and slidably supported to grip 10. Gear support member 32 moves to engage first selecting gear 25 with first intermediate gear 23 and count gear 27 as shown in FIG. 2, or to engage second selecting gear 26 with second intermediate gear 24 and count gear 27 as shown in FIG. 6.

Gear support member 32 is provided at one lengthwise end with a rising provided with a threaded bore 32a. A control member 33 formed of a screw bolt supported to lower half grip 10a screws with threaded bore 32a, and a control head 33a of control member 33 is exposed to the exterior from the outer surface of lower half grip 10a. Control head 33a is rotated to adjust gear support member 32 in the first position shown in FIG. 2 and the second position shown in FIG. 6.

Counter 28 having the downwardly projecting count gear 27 is suspended from upper half grip 10b and has at its upper portion a display unit 28a which converts the number of rotations counted by count gear 27 into a length of the fishing line wound onto spool 6 and displays this length. Display unit 28a faces window 10d.

Also, counter 28 includes a reset button 28b which resets the display of display unit 28a. Reset button 28b is inserted into insertion bore 10e such that it projects at its upper end from upper half grip 10b.

In the fishing reel constructed as described above, reset button 28b is depressed to reset the display and grip 10 is gripped to rotate handle 9, thereby measuring and displaying the length of the wound fishing line.

In other words, when the fishing line drawn out from spool 6 is wound thereon by rotating handle 9, the winding-up length, and in turn the drawn-out length, of the fishing line can be measured.

FIG. 2 shows handle 9 mounted on the right side of reel body 1. In this embodiment, gear support member 32, as shown in FIG. 2, is positioned at the left side in FIG. 2, and first selecting gear 25 is interposed between first intermediate gear 23 and count gear 27. The rotation of output gear 21 is transmitted to count gear 27 through relay gear 22, first intermediate gear 23 and first selecting gear 25.

Handle 9 is rotated with respect to grip 10 so that the fishing line drawn out from spool 6 is wound thereon. Output gear 21 at grip shaft 13 rotates relative to grip 10, and count gear 27 rotates through relay gear 22, first intermediate gear 23 and first selecting gear 25. The number of rotations of count gear 27 is converted into the length of the wound fishing line so as to be displayed by display unit 28a. In this case, a numerical value corresponding to the length of the wound line on spool 6 is displayed, in which the length of the wound-up line is substantially equal to the length of the drawn-out line, whereby the drawn-out length can be read from the wound-up length. For example, after the line is drawn out, handle 9 is rotated during fishing while changing the position of a fishing rig, so that at the time when a fish is hooked, reset button 28b can be depressed to start the measurement of the length of the wound line, thereby enabling the position at which the fish is hooked to be measured.

When the angler transfers by choice handle 9 from the right side to the left side of reel body 1, control member 33 is operated to move gear support member 32 to the second position as shown in FIG. 6.

When handle 9 is mounted on the left side of reel body 1, control member 33 is rotated to move gear support member 32 in the direction of the arrow in FIG. 2 and to disengage first selecting gear 25 from count gear 27 as shown in FIG. 6. Also, second selecting gear 26 engages with second intermediate gear 24 and count gear 27 to thereby transmit the rotation of output gear 21 to count gear 27 through relay gear 22, first and second intermediate gears 23 and 24 and second selecting gear 26.

Since counter 28 is housed in cavity 20 at grip 10, reel body 1 need not be changed in construction from the conventional configuration and counter 28 can be assembled merely by changing the construction of grip 10, whereby the fishing reel can measure and display the length of the wound fishing line and be small in size, lightweight and inexpensive to produce. Also, counter 28 does not project to the exterior, thereby eliminating a risk of its breaking due to hitting foreign objects.

Figure 7:
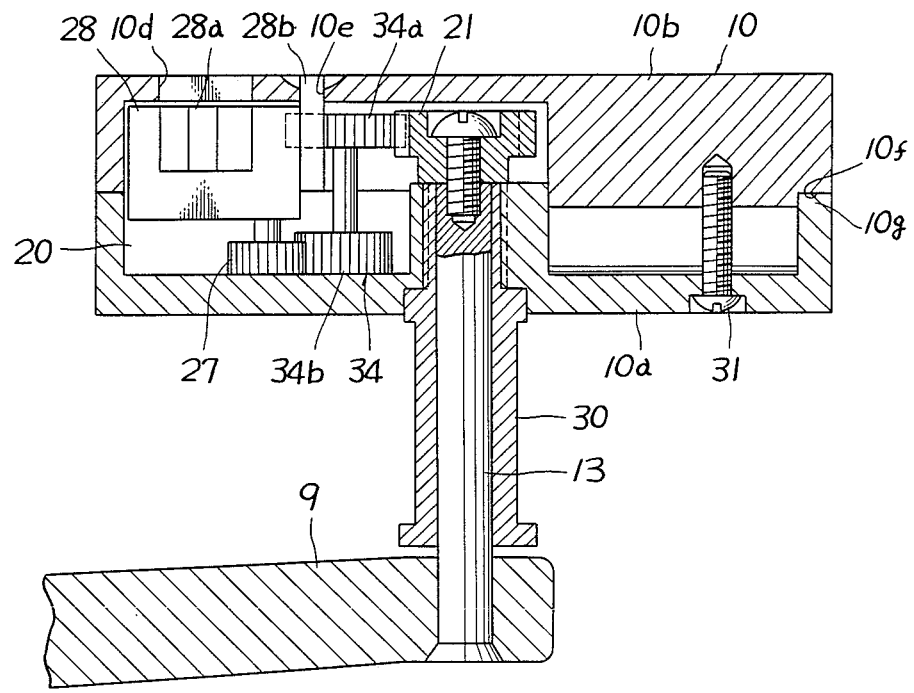
FIG. 7 is an enlarged sectional view of a second embodiment of the fishing reel of the invention, corresponding to FIG. 1.

Alternatively, as shown in FIG. 7, in a case where a fishing reel does not have a reversible handle 9, or the angler need not transfer the handle even for a fishing reel having a transferable handle 9, one intermediate gear 34 having at both vertical ends toothed members 34a and 34b may be used for associating counter 28 with the rotation of handle 9 or the intermediate gears may be omitted so that count gear 27 may directly engage with output gear 21.

Figure 8:
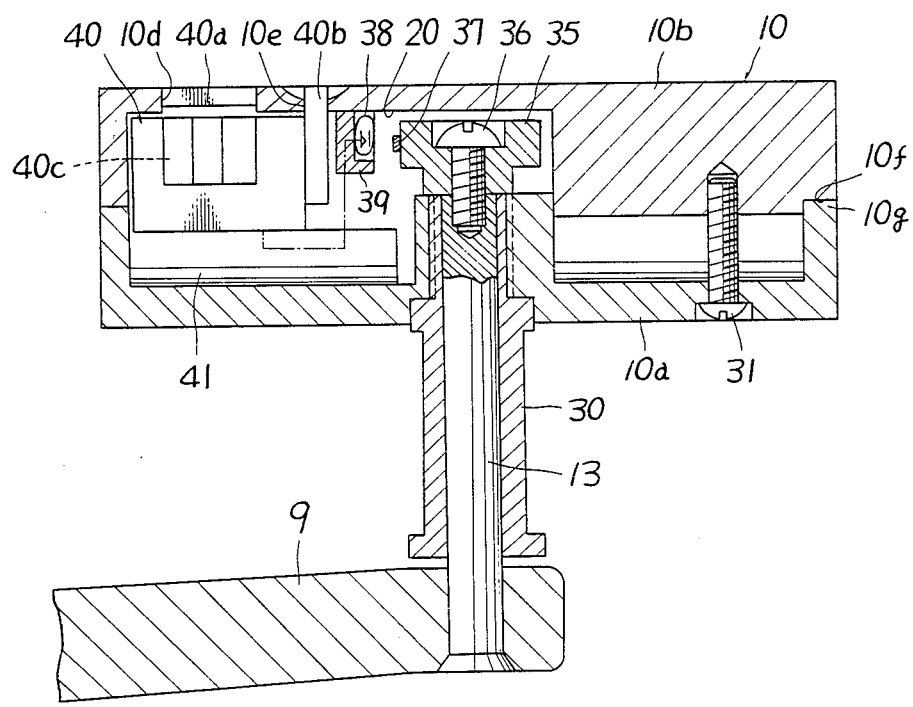
FIG. 8 is an enlarged sectional view of a third embodiment of the fishing reel of the invention, corresponding to FIG. 1.

Alternatively, as shown in FIG. 8, an electrically operable sensor may be used to electrically display the length of the wound fishing line on the basis of a detection output by the sensor. In FIG. 8, the sensor comprises a magnet 37 and a reed switch 38. In detail, a rotary member 35 is mounted to grip shaft 13 through a screw bolt 36. Magnet 37 is mounted on the outer periphery of rotary member 35, and a falling portion 39 opposite to the outer periphery of rotary member 35 is provided in cavity 20 such that it inwardly projects from the wall of upper half grip 10b. Reed switch 38 operates in response to magnet 37 and is provided at falling portion 39, and a microcomputer having an arithmetic unit 40c which computes the fishing line winding-up amount on the basis of on-operation of reed switch 38 is provided at counter 40 housed in cavity 20. With this construction, data computed by arithmetic unit 40c is adapted to be displayed by a display unit 40a by using, for example, a liquid crystal display. In addition, in FIG. 8, reference numeral 40b designates a reset button and reference numeral 41 designates an electric power source.

Alternatively, a window may be formed at the lengthwise end face of grip 10 and display unit 28a or 40a of counter 28 or 40 may face the window.

Also, the present invention is applicable not only to spinning reels, but also to double-bearing reels, closed face reels and one-side bearing reels, which are provided with a handle 9 rotatably supporting a grip 10.

As is apparent from the above, the fishing reel of the invention is provided at a grip 10 rotatable with respect to a handle 9 with a cavity 20, which houses a counter 28 or 40 which, when handle 9 is rotated, responds to the rotation of grip 10 relative to grip shaft 13 fixed to handle 9 so as to count the number of such relative rotations. Hence, the reel body can measure and display the length of wound fishing line without changing the reel body construction or making it large-sized as with the conventional reel, thereby avoiding a high manufacturing cost. Moreover, the counter does not project from the reel body, thus avoiding damage resulting from the counter contacting a foreign object.

Although several embodiments have been described above, they are merely exemplary of the invention and not to be construed as limiting, the invention being defined solely by the appended claims.

I claim:

1. A fishing reel, comprising:
   a reel body;
   a spool supported relative to said reel body;
   a handle rotatably mounted on said reel body for winding up a fishing line on said spool;
   a grip shaft fixed to a free end of said handle;
   a grip rotatably supported relative to said grip shaft and comprising a cavity;
   a counter means, responsive to rotation of said grip shaft relative to said grip, for counting a number of complete revolutions of said grip shaft relative to said grip when said handle rotates and providing an output representing said number of revolutions, said counter means being housed in said cavity;
   a converter means, receiving said output representing said number of revolutions from said counter means, for converting said number of revolutions into a length of said wound fishing line; and
   a display means, responsive to said converter means, for displaying an indication of said length, said display means being disposed on an exterior surface of said grip, such that, when said handle is rotated to wind-up said fishing line on said spool, said display means on said grip displays said indication of said length of said wound fishing line.

2. A fishing reel according to claim 1, wherein said grip shaft has an axial end extending into said cavity and said reel further comprises an output gear fixed to said axial end of said grip shaft, and said counter means is provided with a count gear rotatable in response to rotation of said output gear.

3. A fishing reel according to claim 2, wherein said cavity of said grip has disposed therein (a) first and second intermediate gears which are (i) rotatably supported relative to a wall of said cavity, (ii) disposed opposite to said count gear, (iii) arranged in series with said output gear such that rotation of said output gear is transmitted sequentially to said first intermediate gear and said second intermediate gear, and (iv) different in rotating directions from each other; (b) first and second selecting gears disposed between said count gear and said intermediate gears and opposite thereto respectively, said first and second selecting gears comprising means for selectably controlling engagement of said first intermediate gear with said count gear or engagement of said second intermediate gear with said count gear; (c) a gear support member rotatably supporting said first and second selecting gears and supported to said wall of said cavity to be movable in a direction parallel to said first and second intermediate gears; and (d) a control member having a control portion means for movably controlling said gear support member, said control portion means being disposed on said exterior surface of said grip.

4. A fishing reel according to claim 1, wherein said grip shaft has an axial end extending into said cavity, said counter means includes a sensor means for detecting rotation of said grip shaft relative to said grip, said sensor means being provided between (i) said axial end of said grip shaft and (ii) a member positioned opposite thereto and integral with said grip and rotatable relative to said grip shaft, and said converter means further comprises an arithmetic unit for computing said length of said wound fishing line based on an input signal from said sensor.

* * * * *